US012807884B2

(12) United States Patent
Ristic et al.

(10) Patent No.: US 12,807,884 B2
(45) Date of Patent: Nov. 24, 2026

(54) PROCESS AND APPARATUS FOR CRACKING OF THERMALLY UNSTABLE FEEDSTOCK

(71) Applicant: TotalEnergies OneTech Belgium, Seneffe-Feluy (BE)

(72) Inventors: Nenad Ristic, Seneffe (BE); Laurent Lemineur, Seneffe (BE); Philippe Laurent, Seneffe (BE); Jean-Pierre Thoret-Bauchet, Seneffe (BE)

(73) Assignee: TOTALENERGIES ONETECH BELGIUM, Seneffe (BE)

( * ) Notice: Subject to any disclaimer, the term of this patent is extended or adjusted under 35 U.S.C. 154(b) by 305 days.

(21) Appl. No.: 18/286,614

(22) PCT Filed: Apr. 13, 2022

(86) PCT No.: PCT/EP2022/059878

§ 371 (c)(1),
(2) Date: Oct. 12, 2023

(87) PCT Pub. No.: WO2022/219045

PCT Pub. Date: Oct. 20, 2022

(65) Prior Publication Data

US 2024/0191144 A1 Jun. 13, 2024

(30) Foreign Application Priority Data

Apr. 14, 2021 (EP) .................................... 21168267

(51) Int. Cl.

| | |
|---|---|
| ***C10G 9/36*** | (2006.01) |
| ***B01D 1/06*** | (2006.01) |
| ***B01D 1/22*** | (2006.01) |
| ***B01J 19/00*** | (2006.01) |
| *F28G 3/08* | (2006.01) |
| *F28G 7/00* | (2006.01) |

(52) U.S. Cl.

CPC ............... *C10G 9/36* (2013.01); *B01D 1/065* (2013.01); *B01D 1/22* (2013.01); *B01J 19/0013* (2013.01); *B01J 2219/00092* (2013.01); *C10G 2300/1003* (2013.01); *F28G 3/08* (2013.01); *F28G 7/00* (2013.01)

(58) Field of Classification Search

CPC ........................................................ C10G 9/36

See application file for complete search history.

(56) References Cited

U.S. PATENT DOCUMENTS

| | | | | |
|---|---|---|---|---|
| 7,235,705 B2 | 6/2007 | Stell | | |
| 9,725,657 B2 | 8/2017 | Sirota | | |
| 2005/0261533 A1 | 11/2005 | Stell et al. | | |
| 2007/0232845 A1* | 10/2007 | Baumgartner | C10G 9/14 | 422/198 |
| 2014/0121432 A1* | 5/2014 | Wang | B01J 19/2415 | 585/324 |
| 2014/0209508 A1* | 7/2014 | Hassan | C10G 9/36 | 585/800 |
| 2016/0116237 A1* | 4/2016 | Alsadah | F28G 15/08 | 134/108 |
| 2019/0301808 A1* | 10/2019 | Holtzapple | B01D 1/305 | |
| 2021/0301213 A1* | 9/2021 | Shaikh | C10G 65/10 | |

FOREIGN PATENT DOCUMENTS

| | | |
|---|---|---|
| EP | 0 609 191 A1 | 8/1994 |
| EP | 2 091 638 B1 | 3/2017 |
| EP | 1 999 234 B1 | 5/2018 |
| EP | 1 999 235 B1 | 9/2018 |
| WO | 2013/142623 A1 | 9/2013 |

OTHER PUBLICATIONS

International Search Report for PCT/EP2022/059878 dated Jun. 17, 2022.

Written Opinion for PCT/EP2022/059878 dated Jun. 17, 2022.

* cited by examiner

*Primary Examiner* — Randy Boyer

(74) *Attorney, Agent, or Firm* — Sughrue Mion, PLLC

(57) ABSTRACT

Process for steam cracking of thermally unstable feedstock such as plastic pyrolysis oil, or olefin rich hydrocarbon cuts such as cracked gasoline, coker naphtha or diesel. The invention is also about a heat exchanger suitable for that process.

19 Claims, 1 Drawing Sheet

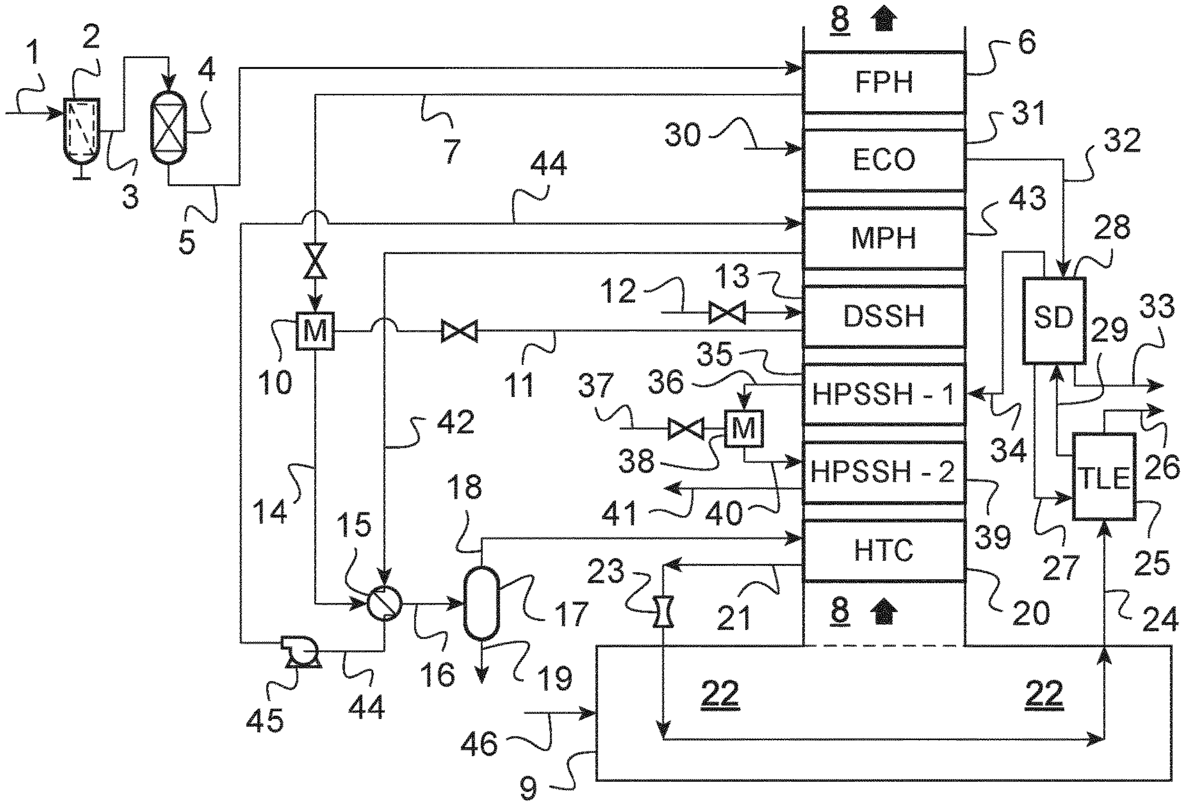
1
2
3
4
5
6
7
8
9
10
11
12
13
14
15
16
17
18
19
20
21
22
23
24
25
26
27
28
29
30
31
32
33
34
35
36
37
38
39
40
41
42
43
44
45
46
FPH
ECO
MPH
DSSH
HPSSH - 1
HPSSH - 2
HTC
M
SD
TLE

PROCESS AND APPARATUS FOR CRACKING OF THERMALLY UNSTABLE FEEDSTOCK

CROSS REFERENCE TO RELATED APPLICATIONS

This application is a National Stage of International Application No. PCT/EP2022/059878 filed Apr. 13, 2022, claiming priority based on European Patent Application Ser. No. 21/168,267.9 filed Apr. 14, 2021, the entire disclosures of which are incorporated by reference.

FIELD OF THE INVENTION

The present disclosure relates to a process and apparatus for cracking of a thermally unstable feedstock. In particular, the invention is suitable for e.g. cracking plastic pyrolysis oil, pyrolysis fuel oil and low aromatics containing hydrocarbon cuts that are containing olefins. The invention is also usable for direct cracking of crude oil or heavy feedstock such as diesel or VGO (vacuum gasoil).

BACKGROUND OF THE INVENTION

Steam crackers are usually designed based on the feedstock to be cracked. Design modification at revamping stage may be challenging since compacity of the unit is high as far as it allows better thermal efficiency and improved product yield.

Rapid changes in unconventional feedstocks use and regulations are in favor of adapting steam crackers to use those materials alone or in combination with conventional feedstock. Such unconventional feedstocks may encompass optionally hydrotreated plastic pyrolysis oil, hydrotreated biomass pyrolysis oil, optionally hydrotreated vacuum gasoil or a crude oil.

Optionally hydrotreated plastic pyrolysis oil may be obtained by pyrolysis of waste plastic that otherwise could have ended in landfill or incinerator, followed by purification including hydrotreatment and contaminant removal.

Waste plastics are mostly diverted to landfills or are incinerated, with a smaller fraction being diverted to recycling. There is however a strong need, influenced by the regulations to limit waste plastic in landfills. On the other hand, waste plastics disposal into landfills is becoming increasingly difficult. There is therefore a need for recycling waste plastic.

There are four methods of chemical recycling, which are substantially different in terms of waste input and obtained products:

- Depolymerization turns mono-stream plastic (only feasible for condensation-type polymers, such as polyesters (notably PET) and polyamides, through hydrolysis or glycolysis) back into monomers or intermediates, which can be re-polymerized into virgin products.
- Solvent extraction (dissolution) is used to extract certain polymers using solvents without breaking down the polymer. Any dyes, pigments, additives and non-target material are removed by the selective dissolution and the resulting polymer can be reprocessed. Sometimes, it can be used for disassembling multi-layer materials.
- Pyrolysis converts mixed plastics into gas, liquid oil and solid residue char. The liquid can be further refined for fuel or new plastics production.
- Gasification allows to process unsorted, uncleaned plastic waste and turn it into syngas, which can be used to build liquid intermediates (methanol, ethanol, naphtha, diesel . . . ) feedstocks for making base chemicals and as building blocks for new polymers. These different methods require specific feedstock specification and result in various product qualities. Gasification requires minor pre-treatment, followed by pyrolysis methods (thermal and catalytic cracking), while intensive pre-treatment is required in case of depolymerization. The low recycling rate stems from the fact that most of the efforts are focused on mechanical recycling that is only suitable for homogenous and contaminant-free plastic waste, which most of the plastic waste streams are not. Post-consumer waste, end-of-life vehicles, waste from construction and demolition, as well as electrical and electronic equipment waste contain a large portion of plastics that cannot be recycled via mechanical routes. Chemical recycling through gasification or pyrolysis still have several hurdles. Gasification plants are very capital intensive, require a subsequent syngas conversion unit and need to be built at large scale to benefit from economy of scale, which implies that large waste streams need to be secured to feed the plant (implying logistical costs, risk of fluctuating flowrates and varying compositions of the syngas). Pyrolysis can often be justified at smaller scale while the multiple liquid product streams can be further processed in centralized plants. Even though pyrolysis can handle any type of organic material, including non-organic materials like metals, glass fibers, halogens, additives and often hetero-atomic containing polymers, like PET and PVC, it remains necessary to remove the impurities from the input stream as much as possible, ideally before the process or afterwards through purification of the pyrolysis oil.

Pyrolysis and gasification transform plastics, and most of their additives and contaminants into gaseous chemicals while most of the non-volatile contaminants or additives end up in the solid by-product; chars or ashes. In principle, any kind of plastic waste can be converted, although some pre-sorting of non-organic waste is desired and purification of the output material is necessary as several hetero-elements (i.e. presently referred to as elements different of carbon, hydrogen or oxygen) may be volatilized.

Plastic waste is a complex and heterogeneous material, due to several factors. First, plastic as material refers to numerous different polymers with different chemical properties that need to be separated from each other prior to recycling. The main polymers found in plastic from municipal solid waste are polyethylene terephthalate (PET), polyethylene (PE), polypropylene (PP) and polystyrene (PS). Other polymers essentially include polyurethanes, polyamides (PA), polycarbonates, polyethers and polyesters other than PET. Second, many different additives are introduced during the production phase to adjust or improve the properties of the plastic or to fulfil specific requirements. These include additives such as functional additives (stabilizers, antistatic agents, flame retardants, plasticizers, lubricants, slipping agents, curing agents, foaming agents, biocides, antioxidants etc.), dyes and pigments, fillers (e.g. glass fibers, talcum, carbon fibers, carbon nanotubes), commonly used in plastic packaging as well as additives such as flame retardants, frequently used in plastic for electronics. In addition, several metal compounds are purposely added during plastic production (often as oxides, carbonates, acids, etc.). Beside metals other hetero elements containing additives are used in making plastics, for instance halogens such as bromine in flame retardants, plasticizers, stabilizers etc.

Silicone polymers, which are silicon containing organic materials, are used often in plastic formulations. Thanks to their surface characteristics, applications for silicones range from silicone rubbers, used as sealants for joints, to silicone surfactants for cosmetic products while they are increasingly used in the plastics sector, as process enhancing additives (processing aids), and for the modification of polymers.

On top of these hetero-elements, the used plastic waste can have been contaminated during lifespan by remains of liquids with which they were in contact (beverages, personal-care products, etc.) and of food that can also introduce contamination of the plastic. Last, some plastic waste may be present in the form of partially decomposed waste, such as partly burnt plastic.

Very limited knowledge currently exists about the fate of metals and other hetero element containing additives during plastic pyrolysis which are scarcely analyzed in the liquid products. During pyrolysis, the solid plastics goes through a melting phase, decomposition and volatilization. The vapors are condensed, forming a liquid product and the remaining gases are separated. Some solid residue remains. Hetero-element containing volatiles can end up in the gases (e.g. HCl, $NH_3$ etc.) or in the liquid product (chloro-aromatic, bromo-aromatics, phenols, carboxylic aromatics, alkyl-amines etc.). During pyrolysis at increased temperature, silicones can convert into volatile siloxanes, having boiling points close to naphtha components.

Pyrolysis of plastic waste allows to produce naphtha, ethylene, propylene and aromatics but those products are polluted by many hetero elements originating from the waste plastic itself. Significant concentration of silicon and of organic silicon can be found in the pyrolysis plastic oils. Many prior art processes were focused on the removal of chlorine compounds.

Most of steam crackers in operation are designed for cracking specific feedstocks and their feedstock flexibility is low since improved flexibility always results in increased expenditures at design and construction stage.

Below are presented some inventions for improving feedstock flexibility.

US 2005/0261533 describes a method for cracking a hydrocarbon feedstock, wherein the hydrocarbon is heated with a fluid or steam then flashed within a separation vessel, wherein the resulting vapor phase is cracked in the radiant section of a steam cracker.

In EP 1999234 and EP 1999235, the feed is pre-heated in the first stage preheater of a steam cracker, then split in a liquid fraction and a gas fraction in a first separator. The gas fraction is heated separately and mixed with the liquid fraction before the mixture is separated again in a second separator. The resulting gas fraction is sent to cracking while the remaining liquid phase is withdrawn.

U.S. Pat. No. 7,235,705 presents a process design like US 2005/0261533, above, and details a specific gas-liquid separator (5) bearing heating and cooling elements located at different positions to mitigate introduction of coke precursors into the cracking section of a steam cracker.

WO2013/142623 shows an integrated vapor liquid separator using cyclonic means, wherein the separated gas phase is further cracked within the radiant section of a steam cracker.

EP 609191 describes a process for steam cracking, wherein a pre-heated feedstock is separated into a gas fraction and a liquid fraction, the liquid fraction being heated separately then mixed with the gas fraction prior to steam cracking.

U.S. Pat. No. 9,725,657 claims a process for cracking an incompatible feedstock within which asphaltenes precipitate comprising recycling a portion of a liquid phase issued from a vapor-liquid separator back into the said vapor-liquid separator to limit formation and deposition of asphaltenes.

EP 2091638 discloses a method for steam cracking crude oil with a specific gas-liquid separator combining a cyclone and a set of vanes imparting a swirling movement to steam.

Traditional convection section design of steam cracker is compact with banks (i.e. heat exchangers) positioned inside a common packed layer furnace casing. Technology licensors mostly rely on optionally superheated dilution steam injection between the first and second or the second and third hydrocarbon bank to prevent convection section fouling while cracking heavy feedstocks. Most advanced designs can incorporate a vapor-liquid separation drum between the second and third convection bank, while others may consider an additional vapor-liquid separation drum between the first and second convection bank. In these cases, non-evaporated liquid is withdrawn from the process while vapor is directed to downstream convection section banks and finally radiant section reaction coils. These technologies are suitable for feedstock with heavy tail, which is forming coke layers in the hottest zones of the convection section and the radiant section. Those layers may be burned and/or spalled off during decoking process.

However, decoking cannot be used in colder convection section zone, wherein sufficient decoking temperature or metallurgical limits prevent efficient coke removal. Some designs foresee hydrogen and water injection to limit coke formation or temperature profile of the convection section alteration. Unpublished European patent application filed on Dec. 10, 2020 filing number EP 20213251.0 to Total, discloses an evaporator-furnace integration for the prevention of convection fouling in case of feedstock coprocessing. However, this design does not allow 100% unstable feedstock processing since severe fouling issues may occur. Additionally, this design would result in overheating of the convection section banks. The energy required for the reaction is higher compared to energy necessary for evaporation of the feed injected directly into the furnace. Accordingly, the more co-feed is injected, the more the energy requirement discrepancy is observed when compared to usual average temperature profile in convection section.

Most of the above-mentioned steam cracker designs aim to convert non olefinic feedstocks such as crude oil or coprocessing of thermally unstable feedstock with limited throughput. There is thus a need to provide processing technologies for steam cracking of thermally unstable feedstock along with fouling prevention and cleaning operations improvement.

SUMMARY OF THE INVENTION

According to a first aspect, the invention relates to a process for steam cracking of a thermally unstable feedstock comprising the steps of:

(a). preheating the thermally unstable feedstock at a temperature and a pressure wherein most, preferably substantially all, of the feedstock remains liquid, wherein preheating is achieved using convection heat from a steam cracker furnace, (b). combining the preheated feedstock of step (a) with steam to obtain a heated feedstock, (c). heating the heated feedstock of step (b) to produce a gasified feedstock and a residue, (d). heating the gasified feedstock of step (c) using convection heat to obtain a heated gasified feedstock, (e). steam cracking of the heated gasified feedstock to obtain cracked gases, (f). recovering and cooling down cracked gases of step (e), wherein heating at step (c) is not performed within a convection section of a steam cracker furnace.

This design is useful for facilitating fouling cleanup in the relatively low temperature sections of the convection section of a steam cracker, especially the one used for step (c), since the unit used for gasification is not integrated into the cracking furnace convection section and is thus accessible for regular maintenance work.

Additionally the design is useful for minimizing the fouling in step (a), since the temperature of the convection section tube walls is minimal possible (e.g., less than 250° C., preferably less than 150-C and most preferably less than 120° C.) and the feedstock is kept to a large extent (preferably completely) in liquid phase.

At the same time no or limited fouling could occur in those low temperature sections as long as a fluid deprived of coking potential is used therein for recuperation of flue gas energy and heating of stream in step (c). Suitable fluid includes e.g. water and/or steam, paraffinic oil and silicone oil.

The thermally unstable feedstock may be filtered before use in the present process to remove gums and/or solids, if present.

Heating at step (c) is preferably performed using a dedicated heating fluid such as boiler teed water, steam or a liquid hydrocarbon or mixture of liquid hydrocarbons, preferably chosen among aromatic hydrocarbons, linear, branched and/or cyclic paraffinic hydrocarbons and their mixtures or silicone oil.

Heating fluid is preferably heated using flue gas within the steam cracking furnace convection section and said heating fluid is optionally in a circulation loop. A heating fluid circulation loop is preferred. Steam is a preferred heating fluid.

The residue of step (c) is preferably separated into a liquid residue and a solid residue by gravity drainage or sedimentation, filtration, centrifugation, flocculation, high boiling oil extraction, or a combination of at least two of them.

The liquid residue is advantageously (i) processed into a plastic pyrolysis oil production process, (ii) mixed with quench oil produced by steam cracker, or (iii) mixed with steam cracker pyrolysis fuel oil.

Steam from step (b) is preferably obtained by heating steam in the convection section of a steam cracker furnace. An appropriate bank located within the convection section may be a dilution steam superheater bank.

The combination of the preheated feedstock of step (a) with steam in step (b) is preferably performed outside the convection section of the steam cracker furnace, for example in a mixing section.

It is highly desirable that solids and optionally gums are removed from the thermally unstable feedstock prior to preheating at step (a). This is to avoid excessive fouling when operating a process unit.

Heteroatoms containing impurities are preferably removed, at least in part, from the thermally unstable feedstock prior to preheating at step (a).

Excessive deterioration of the thermally unstable feedstock may be mitigated using a stabilizer such as a hindered phenol such as 2,6-di-tert-butyl-4-methylphenol (BHT), or a mixture of at least two stabilizers, which is added to the thermally unstable feedstock prior to preheating at step (a). Appropriate additives to prevent fouling also include antioxidant, dispersant and polymerization retardants which have a high boiling point such as hindered phenol dimers such as Irganox @ series, sold by BASF.

The thermally unstable feedstock is preferably selected among optionally hydrotreated plastic pyrolysis oil, optionally hydrotreated biomass pyrolysis oil, optionally hydrotreated vacuum gasoil, crude oil, atmospheric or vacuum distillation residues, or a combination of at least two of them, preferably an optionally hydrotreated plastic pyrolysis oil having a diene value of at least 1 g $I_2$/100 g as measured according to UOP 326, a bromine number of at least 5 g $Br_2$/100 g as measured according to ASTM D1159, wherein the content of the said optionally hydrotreated pyrolysis oil is at least 2 wt %, the remaining part being a diluent such as a hydrocarbon and/or steam.

The residue at step (c) contains solid and/or liquid and is separated from the gasified feedstock by gravity drainage or sedimentation, filtration, centrifugation, flocculation, high boiling oil spray extraction, single or double wall thin film evaporator with or without the use of high boiling oil diluent or spray, or a combination of at least two of them, preferably single or double wall thin film evaporation.

The gasified feedstock of step (c) can be obtained using single or double wall thin film evaporator with or without the use of high boiling oil diluent or spray, or by using single or double wall thin film evaporation, falling film evaporator or kettle type evaporator or within a first shell and tube heat exchanger. The gasified feedstock is then obtained by evaporation using an evaporator or a vaporizer, in particular using a dedicated heating fluid above mentioned. More preferably by evaporation within a first straight-tube shell and tube heat exchanger, preferably within the tubes constituting the first shell and tube heat exchanger. The tubes optionally contain an anti-fouling device such as rotating or vibrating springs such as Turbotal® or Spirelf®. The tubes can optionally be coated with a material with anti-fouling properties such as an anti-adhesive ceramic material coating having a modified surface to limit anchoring of fouling precursors or an anti-adhesive polymer such as a fluorinated polymer like PTFE (polytetrafluoroethylene) or fluorinated polyacrylic or polymethacrylic acid or ester. According to a preferred embodiment, the first shell and tube heat exchanger contains a purge for removal of the residue.

Advantageously, should fouling occur rapidly, the first shell and tube heat exchanger is connected in parallel with a second shell and tube heat exchanger. In this case, the first shell and tube heat exchanger is in operation when the second one is under cleaning, and vice-versa In general, it is desirable that the evaporator or vaporizer used for producing the gasified feedstock and the residue can be easily and rapidly cleaned from fouling layers which may form. Continuous cleanup evaporators such as thin film evaporators are particularly efficient, but their cost of acquisition and capacity renders their use for treatment of large volumes of feedstock not easily accessible. Other equipment such as falling film evaporator or shell and tube evaporator can be used provided design is adapted for ease of cleaning. For instance, when shell and tube evaporator is desired, U-shaped tube bundles are not preferred since it is usually more difficult to remove fouling in elbows than in straight tubes.

The use of an evaporator for producing the gasified feedstock and the residue allows bringing part of the thermal energy required for the downstream cracking reaction by such evaporator or vaporizer, more specifically by a heating fluid circulating within the evaporator without contacting directly the feedstock to gasify, the remaining of the thermal energy required being brought by the steam combined with the preheating feedstock in step (b). This allows reducing the temperature of the steam to combine in step (b) and thus reducing the risk of fouling in step (b). Thus, in a preferred embodiment of the present invention, the gasified feedstock is not produced by direct contact of the feedstock with superheated steam, as may occur in a mixing device or in a cyclone, but by evaporation in an evaporator or vaporizer, for example by using the dedicated heated fluid above described.

According to a second aspect, the invention concerns a shell and tube heat exchanger comprising an outer shell and a straight tube bundle within the said outer shell, the tube bundle being connected at one end to an inlet plenum having a tube-side fluid inlet for a first fluid, the straight tube bundle leading at the other end to an outlet plenum having a tube-side fluid outlet for the said first fluid, the tube bundle passing through a sealed compartment comprising a shell-side fluid inlet for a second fluid and a shell-side fluid outlet for the second fluid, wherein the outlet plenum further comprises an outlet purge. Ideally, cleaning means are arranged within the tube hollows of the bundle. Suitable cleaning means include Turbotal® and Spirelf® devices, which are respectively rotating and vibrating springs, scraping the inner surface of the tubes. The bundle may contain baffles arranged in a way to optimize heat exchange. The latter arrangement is known to those skilled in the art of shell and tube heat exchanger design.

One pass or two pass straight tube exchanger is preferred. When possible, it is desirable that, in case a one pass straight tube exchanger is used, that the shell and tube exchanger is set with tube bundle arranged vertically so that the at least partly liquid feedstock enters the inlet plenum at the top side, is vaporized in the tubes and leaves as (i) fully gasified feedstock through a lateral outlet in the bottom plenum for further processing, and (ii) as residue, which is withdrawn by gravity at the very bottom of the bottom plenum.

The shell and tube heat exchanger described above may advantageously be used as an evaporator in step (c) of the process of the present invention.

Definitions

The terms "alkane" or "alkanes" as used herein describe acyclic branched or unbranched hydrocarbons having the general formula $C_nH_{2n+2}$, and therefore consisting entirely of hydrogen atoms and saturated carbon atoms; see e.g. IUPAC. Compendium of Chemical Terminology, 2nd ed. (1997). The term "alkanes" accordingly describes unbranched alkanes ("normal-paraffins" or "n-paraffins" or "n-alkanes" or "paraffins") and branched alkanes ("iso-paraffins" or "iso-alkanes") but excludes naphthenes (cycloalkanes). They are sometimes referred to by the symbol "HC=".

The terms "olefin", "olefins", "alkene" or "alkenes" as used herein relate to an unsaturated hydrocarbon compound containing at least one carbon-carbon double bond. They are sometimes referred to by the symbol "HC=".

The terms "alkyne" or "alkynes" as used herein relate to an unsaturated hydrocarbon compound containing at least one carbon-carbon triple bond.

The term "hydrocarbon" or "hydrocarbons" refers to the alkanes (saturated hydrocarbons), cycloalkanes, aromatics and unsaturated hydrocarbons alone or in combination.

As used herein, the terms "$C_{\#}$alcohols", "$C_{\#}$alkenes", or "$C_{\#}$hydrocarbons", wherein "#" is a positive integer, is meant to describe respectively all alcohols, alkenes or hydrocarbons having $_{\#}$carbon atoms. Moreover, the term "$C_{\#+}$ alcohols", "$C_{\#+}$ alkenes", or "$C_{\#+}$ hydrocarbons", is meant to describe all alcohol molecules, alkene molecules or hydrocarbons molecules having $_{\#}$or more carbon atoms. Accordingly, the expression "$C_{5+}$ alcohols" is meant to describe a mixture of alcohols having 5 or more carbon atoms.

Weight hourly space velocity (WHSV) is defined as the hourly weight of flow per unit weight of catalyst and liquid hourly space velocity (LHSV) is defined as the hourly volume of flow per unit of volume of catalyst.

The terms "comprising", and "comprises" as used herein are synonymous with "including", "includes" or "containing", "contains", and are inclusive or open-ended and do not exclude additional, non-recited members, elements or method steps.

The recitation of numerical ranges by endpoints includes all integer numbers and, where appropriate, fractions subsumed within that range (e.g. 1 to 5 can include 1; 2; 3; 4 and 5 when referring to, for example, a number of elements, and can also include 1.5; 2; 2.75 and 3.80; when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The term "conversion" means the mole fraction (i.e., percent) of a reactant converted to a product or products. The term "selectivity" refers to the percent of converted reactant that went to a specified product.

The terms "wt. %", "wt %", "vol. %", "vol %", "mol %" or "mol. %" refer to a weight, volume, or molar percentage of a component, respectively, based on the total weight, the total volume of material, or total moles, that includes the component. In a non-limiting example, 10 grams of component within 100 grams of the material is 10 wt % of components.

The term "barg" is a relative pressure which stands for bar gauge. When a vessel or device has an internal pressure of 1 barg, it corresponds to the pressure of 1 bar relative to atmospheric pressure (or 1 bara). So, if atmospheric pressure is 1 bar, absolute pressure within the vessel is 2 bar or 2 bara. 1 bar is equivalent to 1 barg. Unless otherwise specified, pressures mentioned in the present document are relative pressures.

The term "naphtha" refers to the general definition used in the oil and gas industry. In particular, it refers to a hydrocarbon originating from crude oil distillation having a boiling range from 15 to 250° C. as measured by ASTM D2887. Naphtha contains substantially no olefin as the hydrocarbons originates from crude oil. It is generally considered that a naphtha has carbon number between $C_3$ and $C_{11}$, although the carbon number can reach in some case $C_{15}$. It is also generally admitted that the density of naphtha ranges from 0.65 to 0.77 g/mL.

The term "gas oil" refers to the general definition used in the oil and gas industry. In particular, it refers to a hydrocarbon originating from crude oil distillation having a boiling range from 210 to 360° C. as measured by ASTM D86. Gas oil contains substantially no olefin as the hydrocarbons originates from crude oil. It is generally considered that a gas oil has carbon number between $C_{12}$ and $C_{20}$, although the carbon number can reach in some case $C_{25}$. It is also generally admitted that the density of gas oil ranges from 0.82 to 0.86 g/mL, wherein commercial specification limits density to 0.86 g/mL according to ASTM D1298 (ISO 3675, IP 160).

The term "atmospheric gas oil" or AGO refers to a gas oil having a boiling range from 210° C. to 360° C. as measured by ASTM D86. It is usually a straight run gas oil, i.e. a gas oil which is directly issued from the distillation of crude petroleum.

The term "vacuum gas oil" or VGO refers to a gas oil having a boiling range typically from 260° C. to 580° C. as measured by ASTM D1160, usually obtained by vacuum distillation of atmospheric residue.

The term "fuel oil" refers to a broad class of hydrocarbons having boiling point range higher than gasoline and naphtha, suitable for burning in furnaces or marine engines.

The term "pyrolysis fuel oil" refers either to a fuel oil obtained by pyrolysis of biomass such as wood or straw, or to a fuel oil obtained as the residual fraction from the distillation of the products of a steam cracking process consisting predominantly of unsaturated hydrocarbons having carbon numbers predominantly greater than $C_{14}$ and boiling above approximatively 260° C. (CE number 265-193-8 and CAS number 64742-90-1).

The term "pyrolysis gasoline" here refers to hydrogenated gasoline cut resulting from steam cracking of hydrocarbons boiling in the range of approximatively 20° C. to 200° C. (EC number 302-639-3 and CAS number 941114-03-1).

The term "LPG" refers to the general definition used in the oil and gas industry. In particular, it refers to a hydrocarbon essentially comprised of $C_3$ (propane) with some $C_4$ isomers; n-butane and isobutene.

The term "pyrolysis plastic oil", "plastic pyrolysis oil" or "oil resulting from the pyrolysis of plastic" refers to the liquid products obtained once waste plastic or plastic waste have been thermally pyrolyzed. The pyrolysis process shall be understood as an unselective thermal cracking process. The plastic to be pyrolyzed can be of any type. For instance, the plastic to be pyrolyzed can be polyethylene, polypropylene, polystyrene, polyester, polyamide, polycarbonate, etc. These pyrolysis plastic oils contain paraffins, i-paraffins (iso-paraffins), dienes, alkynes, olefins, naphthenes, and aromatic components. Pyrolysis plastic oil may also contain impurities such as organic chlorides, organic silicon compounds, metals, salts, sulfur, oxygen and nitrogen compounds, etc. The plastic used for generating pyrolysis plastic oil is a waste plastic, irrespective of its origin or nature. The composition of the pyrolysis plastic oil is dependent on the type of plastic that is pyrolyzed. Pyrolysis plastic oil is mainly constituted of hydrocarbons having from 1 to 50 carbon atoms and impurities.

The term "Diene Value" (DV) or "Maleic Anhydride Value" (MAV) corresponds to the amount of maleic anhydride (expressed as equivalents of iodine) which will react with 100 parts of oil under specific conditions. It is a measure of the conjugated double bonds in the oil. One mole of Maleic anhydride corresponds to 1 conjugated double bond. One known method to quantify dienes is the UOP 326: Diene Value by Maleic Anhydride Addition Reaction. The term "diene value" (DV) refers to the analytical method by titration expressed in g of iodine per 100 g of sample. The term Maleic Anhydride value (MAV) refers to the analytical method by titration expressed in mg of Maleic acid per g of sample. There is a correlation between the MAV=DV×3,863 since 2 moles of iodine correspond to 1 mole of Maleic Anhydride.

The term "bromine number" corresponds to the amount of reacted bromine in grams by 100 grams of sample. The number indicates the quantity of olefins in a sample. It is determined in grams of $Br_2$ per 100 grams of sample ($gBr_2/100$ g) and can be measured according to ASTM D1159 method.

The term "bromine index" is the number of milligrams of bromine that react with 100 grams of sample. It is determined in milligrams of $Br_2$ per 100 g of solution (mg $Br_2/100$ g) and can be measured for instance according to the method ASTM D2710.

The term "boiling point" refers to boiling point generally used in the oil and gas industry. Boiling point is measured at atmospheric pressure. The initial boiling point is defined as the temperature value when the first bubble of vapor is formed. The final boiling point is the highest temperature that can be reached during a standard distillation. At this temperature, no more vapor can be driven over into the condensing units. The determination of the initial and final boiling points is known in the art. Depending on the boiling range of the mixture, various standardized methods can be used, such as ASTM D2887 relating to the boiling range distribution of petroleum fractions by gas chromatography. For compositions containing heavier hydrocarbons ASTM D7169 may alternatively be used. Boiling range of distillates is advantageously measured using ASTM D7500, D86 or D1160.

The concentration of metals in the matrix of hydrocarbon can be determined by any method known in the art. Relevant characterization methods include XRF or ICP-AES methods. Those skilled in the art know which method is the most adapted to each metal measurement and to which hydrocarbon matrix.

Features, structures, characteristics or embodiments may be combined in any suitable manner, as would be apparent to a person skilled in the art from this disclosure, in one or more embodiments.

DETAILED DESCRIPTION OF THE INVENTION

Detailed Description of the Figure

FIG. 1 shows a simplified overview of a possible process scheme according to the invention.

A gums and solids containing feedstock (1) is introduced into a filter unit (2) to produce a filtered stream (3). Filtration aims to remove solids and gums, which may be present when the stream contained unsaturated hydrocarbons at the origin and when storage conditions were not appropriate. For instance, excessive heat, oxygen, lack of antioxidant, traces of catalytic metals may result in gums and/or solids formation. Hydrocarbon containing feedstocks particularly prone to gums and/or solids formation include without limitation plastic pyrolysis oil, vacuum gasoil, diesel and heavier cuts from fluid catalytic cracking, oils from biological origin such as castor oil, linen oil or used cooking oil. Other means to remove solids and gums may be used, such as centrifugation. Filtered stream (3) is then passed through an adsorbent section (4) to remove contaminants such as oxygen, nitrogen and sulfur containing molecules and metals to provide a gums and solids depleted thermally unstable feedstock (5). Filtration (3) and adsorption (4) are preferably conducted at ambient or near ambient temperature since heating may result in lowered stream chemical stability and lower process performance. Other methods for contaminant removal may be appropriate, including e.g. one or two stage hydrotreatment, flocculation, coalescence and precipitation. The thermally unstable feedstock (5) is then heated within a feedstock preheater (FPH) bank (6) of the convection section (8) of a steam cracker furnace (9) to produce a preheated feedstock (7). The preheated feedstock (7) is heated in a first mixing section M (10) by addition of steam (11) obtained by heating colder steam (12) within a diluted steam super heater (DSSH) bank (13) to provide a heated feedstock (14). It is desirable that the final temperature of heated feedstock (14) at the outlet of first mixing section M (10) be above the temperature of steam condensation at a given pressure to avoid any hammering issues. If this is not the case, increasing temperature of steam (11) and/or increasing flowrate of steam (11) and/or lowering flowrate of preheated feedstock (7) and/or lowering pressure in first mixing section M (10) shall be considered. It is preferable to avoid excessive preheating of preheated feedstock (7) prior to mixing with steam (11). Heated feedstock (14) enters a vaporizer (15) to produce a combined gasified feedstock and residue (16). A dedicated heated fluid (42), which has been heated within a medium pre-heater bank (MPH) (43), feeds vaporizer (15) and results in vaporization of heated feedstock (14) and in a colder heated fluid (44), the latter being pumped through pump (45) back to medium pre-heater bank (MPH) (43).

Combined gasified feedstock and residue (16) is separated in a flash drum (17) into a gasified feedstock (18) and a residue (19), which is withdrawn. Gasified feedstock (18) is heated in a high temperature convection bank (HTC) (20) to provide a heated gasified feedstock (21), which enters radiant section (22) of cracker furnace (9) through nozzle (23), to be cracked.

Resulting cracked gases (24), when leaving radiant section (22) of furnace (9) are rapidly quenched within a transfer line exchanger (TLE) (25) and directed in line (26) to be processed in a separation section (not shown) wherein olefins of interest, especially ethylene and propylene, are isolated along with other higher molecular weight products such as butadiene and aromatics. Optionally, cracked gases quenching may also be performed through two successive transfer line exchangers.

Transfer line exchanger (TLE) (25) allows rapid cooling of cracked gases (24) by means of a heat exchanger wherein water is circulated. Water (27) coming from the bottom of a steam drum (SD) (28) is vaporized in the transfer line exchanger (TLE) (25) and sent back to steam drum (SD) (28) through line (29). Additional water (30) is pre-heated within the convection section (8) in exchanger (ECO) (31), then resulting pre-heated water (32) feeds steam drum (SD) (28). Steam drum (SD) (28) is regulated using purge line (33). Vapor from steam drum (SD) (28) is sent through line (34) into a first high pressure steam super heater bank (HPSSH-1) (35) wherein steam is super-heated. Resulting super-heated steam (36) is then quenched with water stream (37) in a second mixing section M (38) before introduction in second high pressure steam super heater bank (HPSSH-2) (39) through line (40). Second mixing section M (38) enables thermal regulation of convection section (8) through cooling of stream (36). Last, high pressure steam leaves high pressure steam super heater bank (HPSSH-2) (39) through line (41) for further use.

Radiant section (22) is heated using fuel gas feeding through line (46) (combustion air inlet not shown). Combustion gases leave radiant section (22) to enter convection section (8) (see, bottom arrow) wherein their heat is used by different heat exchangers, respectively HTC, HPSSH-2, HPSSH-1, DSSH, MPH, ECO and FPH, before release (see, upper arrow). Decoking steam and process air connections (not shown) can be added on any of the feeding lines and on various locations to allow simultaneous or sequential on-line decoking of vaporizer (15), flash drum (17) and furnace (9). Suitable connections may be located for instance on the feedstock convection section entering line (5) or on the first mixing section M (10) or on preheated feedstock (7) line that feeds said first mixing section M (10), the steam inlet line (12), the heated feedstock (14) line, the combined gasified feedstock and residue (16) line, the flash drum (17), the gasified feedstock (18) line, the residue (19) line, the heated gasified feedstock (21) line, and the cracked gases (24) line. Although not shown in FIG. 1, location of convection section banks can be changed if the temperature requirements are respected. The only exception is FPH bank that needs to be on the top to benefit from the lowest possible tube wall temperatures. For example, the lowest convection section bank (i.e. with highest tube wall temperature) does not need to be HTC but could instead be HPSSH-2. Alternatively, DSSH can be the lowest convection section bank. The location of convection section banks as shown in FIG. 1 should be considered an illustrative and non-limitative example of the invention.

EXAMPLE

The embodiments of the present invention will be better understood by looking at the following example, below.

A thermally unstable feedstock (1) consisting of plastic pyrolysis oil containing 3 wt % of solid particles having a 10 μm mean particles diameter may be contacted with a stabilizer to avoid gums formation or buildup. The plastic pyrolysis oil stream has a final boiling point (FBP) of 420° C. A suitable stabilizer may be an antioxidant such as 2,6-di-tert-butyl-4-methylphenol (BHT) or derivatives such as Irganox @ products (BASF). The amount of stabilizer to be added may be determined by those skilled in the art and may range from 0,001 wt % to 0.1 wt %, depending e.g. on the nature of the plastic pyrolysis oil and treatment conditions.

The resulting mixture can then be filtered through a candle filter (2) to produce (i) a solid cake that is discharged and (ii) a solids and gums depleted liquid phase (3) which may pass through at least one bed of impurities adsorbent (4) to remove polar constituents that are containing heteroatoms and metals. Suitable adsorbent beds include commercial adsorbents which may be selected through preliminary validation tests to check their adsorption capability with regards to the nature of the feedstock to be processed. When leaving adsorption section (4) the resulting impurities depleted thermally unstable feedstock (5) should contain less chlorine, less oxygen containing impurities and less metals than plastic pyrolysis oil starting material (1).

Albeit not mandatory, and depending on steam cracker technology, the impurities depleted thermally unstable feedstock (5) may be diluted with another thermally unstable feedstock e.g. a cracked naphtha or diesel or with other feedstock such as VGO, a gas oil, diesel, a naphtha, butane or any combinations thereof.

The thermally unstable feedstock under the form of the above-described solids and gums depleted liquid phase (5) can be introduced at 50° C. in the feedstock preheater (FPH) (6) bank of a steam cracker (9) at a rate of 12 t/h and 3.4 barg to produce preheated feedstock (7) at 92° C. 8.4 t/h of diluted steam (12) at 190° C. and 3.9 barg is heated in DSSH bank (13) to produce heated diluted stream (11) at 396° C. and 3.7 barg. Heated diluted steam (11) is introduced in first mixer M (10) wherein it combines with preheated feedstock (7) to produce 20.4 t/h of steam containing heated feedstock (14) at 177° C. and 3.4 barg. The latter is directly sent in vaporizer (15) to produce combined gasified feedstock and residue (16) at 268° C. and 2.9 barg, which is separated in flash drum (17) into 1.2 t/h of residue which is drawn off through residue purge line (19) and into gasified feedstock, which is directed in line (18) at 2.8 barg for further processing.

Alternatively, vaporizer (15) and flash drum (17) are combined in one single equipment by using a thin film evaporator or preferably a straight tube shell and tube heat exchanger equipped with a purge line at the bottom of the outlet plenum, as described above. When necessary, a couple of straight tube and shell evaporators are connected in parallel, wherein one is in operation while the other is being cleaned.

Vaporizer (15) is fed with a loop of 11 t/h of water at 308° C. and 126 barg (42) coming from the outlet of MPH bank (43), to produce above-mentioned stream (16) and colder water at 200° C. and 126.8 barg (44). Colder water (44) is then pumped back using pump (45) to MPH bank at 127 barg.

Gasified feedstock (19) is heated in HTC bank (20) to produce heated gasified feedstock (21) at 540° C. and 2.5 barg which is then cracked in radiant section (22) coils, wherein furnace delivers 32 t/h of flue gas at 1100° C. to HTC bank (20) within convection section (8). Heated gasified feedstock (21) is sent to radiant section (22) coils through nozzle (23). Furnace coil outlet stream (24) temperature is kept at 809° C., coil outlet pressure is 0.6 barg, while the residence time is set at 0.3 s. The TLE outlet stream (26) temperature is 363° C. and pressure 0.56 barg. Flue gas leaving HTC bank (20) at 789° C. then heat 12.8 t/h of high pressure steam (40) at 365° C. and 125.1 barg within HPSSH-2 bank (39) to generate high pressure steam (41) at 480° C. and 124.7 barg. Flue gas leaving HPSSH-2 bank (39) at 669° C. heat HPSSH-1 bank (35). High pressure steam (40) comes from second mixer M (38) and results from combination of 100 kg/h of quench water (37) at 127 barg and 116° C. with 12.7 t/h of high pressure steam (36) at 370° C. and 125.4 barg. High pressure steam (36) is delivered by HPSSH-1 bank (35) by heating of high pressure steam (34) at 329° C. and 125.6 barg coming from steam drum (28).

Flue gas leaving HPSSH-1 bank (35) at 591° C. then transfer heat to DSSH bank (13) and leaves the latter at 500° C., then transfer heat to MPH bank (43) and leaves MPH bank (43) at 350° C. Flue gas at 350° C. further transfers heat to economizer ECO bank (31) and leaves at 144° C. Economizer ECO bank (31) is fed with 21 t/h of cold boiler feed water at 116° C. and 127 barg and leaves ECO bank (31) through line (32) at 200° C. and 126 barg to feed steam drum (28). Last, flue gas at 144° C. transfers heat to feedstock preheater FPH bank (36) and finally leaves convection section through a stack at 113° C.

The radiant section contains a radiant box heated with 1.5 t/h of fuel gas at 43° C. burning with 9.1% air excess introduced at 7° C. The low heating value (LHV) of fuel gas is 12368 kcal/kg at 25° C. Fired heat is 18.5 Gcal/h at 25° C., radiant section absorbed heat is 8.4 Gcal/h, box efficiency based on fired heat is 45%, convection duty is 8.8 Gcal/h, for an overall efficiency of 95.5%.

The invention claimed is:

1. Process for steam cracking of a thermally unstable feedstock comprising the steps of:

(a). preheating the thermally unstable feedstock at a temperature and a pressure wherein most or all of the feedstock remains liquid, wherein preheating is achieved using convection heat from a steam cracker furnace, (b). combining the preheated feedstock of step (a) with steam to obtain a heated feedstock, (c). heating the heated feedstock of step (b) using an evaporator to produce a gasified feedstock by evaporation and a residue, (d). heating the gasified feedstock of step (c) using convection heat to obtain a heated gasified feedstock, (e). steam cracking of the heated gasified feedstock to obtain cracked gases, (f). recovering and cooling down cracked gases of step (e), wherein heating at step (c) is not performed within a convection section of a steam cracker furnace, and the residue of step (c) is separated into a liquid residue and a solid residue by gravity drainage or sedimentation, filtration, centrifugation, flocculation, high boiling oil extraction, or a combination of at least two of them.

2. Process according to claim 1, wherein heating at step (c) is performed using a dedicated heating fluid selected from the group consisting of boiler feed water, steam, a liquid hydrocarbon or mixture of liquid hydrocarbons, and their mixtures.

3. Process according to claim 2, wherein heating fluid is heated using flue gas within the steam cracking furnace convection section and wherein the heating fluid is optionally in a circulation loop.

4. Process according to claim 1, wherein the liquid residue is (i) processed into a plastic pyrolysis oil production process, (ii) mixed with quench oil produced by steam cracker, or (iii) mixed with steam cracker pyrolysis fuel oil.

5. Process according to claim 1, wherein steam from step (b) is obtained by heating steam in the convection section of a steam cracker furnace.

6. Process according to claim 1, wherein solids and optionally gums are removed from the thermally unstable feedstock prior to preheating at step (a).

7. Process according to claim 1, wherein heteroatoms containing impurities are removed from the thermally unstable feedstock prior to preheating at step (a).

8. Process according to claim 1, wherein a stabilizer, or a mixture of at least two stabilizers, is added to the thermally unstable feedstock prior to preheating at step (a).

9. Process according to claim 1, wherein the thermally unstable feedstock is selected among optionally hydrotreated plastic pyrolysis oil, optionally hydrotreated biomass pyrolysis oil, optionally hydrotreated vacuum gasoil, crude oil, atmospheric or vacuum distillation residues, or a combination of at least two of them, wherein the content of the said optionally hydrotreated pyrolysis oil is at least 2 wt %, the remaining part being a diluent such as a hydrocarbon and/or steam.

10. Process according to claim 1, wherein the residue at step (c) contains solid and/or liquid, and is separated from the gasified feedstock by gravity drainage or sedimentation, filtration, centrifugation, flocculation, high boiling oil spray extraction, single or double wall thin film evaporator with or without the use of high boiling oil diluent or spray, or a combination of at least two of them.

11. Process according to claim 1, wherein the gasified feedstock of step (c) is obtained by evaporation using single or double wall thin film evaporator with or without the use of high boiling oil diluent or spray, or by using single or double wall thin film evaporation, falling film evaporator or kettle type evaporator or within a first shell and tube heat exchanger.

12. Process according to claim 1, wherein the gasified feedstock of step (c) is obtained by evaporation within a first straight-tube shell and tube heat exchanger, and wherein the tubes optionally contain an anti-fouling device such as rotating or vibrating springs.

13. Process according to claim 12, wherein the first shell and tube heat exchanger contains a purge for removal of the residue.

14. Process according to claim 12, wherein the first shell and tube heat exchanger comprises an outer shell and a straight tube bundle within the said outer shell, the tube bundle being connected at one end to an inlet plenum having a tube-side fluid inlet for a first fluid, the straight tube bundle leading at the other end to an outlet plenum having a tube-side fluid outlet for the said first fluid, the tube bundle passing through a sealed compartment comprising a shell-side fluid inlet for a second fluid and a shell-side fluid outlet for the second fluid, wherein the outlet plenum further comprises an outlet purge.

15. Process according to claim 14, wherein the first shell and tube heat exchanger further comprises anti-fouling coating and/or cleaning means arranged within the tube hollows of the bundle.

16. Process according to claim 2, wherein the dedicated heating fluid is chosen among aromatic hydrocarbons, linear, branched and/or cyclic paraffinic hydrocarbons and their mixtures.

17. Process according to claim 8, wherein the stabilizer is a hindered phenol.

18. Process according to claim 8, wherein the stabilizer is 2,6-di-tert-butyl-4-methylphenol.

19. Process according to claim 9, wherein the unstable feedstock is an optionally hydrotreated plastic pyrolysis oil having a diene value of at least 1 g I2/100 g as measured according to UOP 326, a bromine number of at least 5 g Br2/100 g as measured according to ASTM D1159.

* * * * *